United States Patent
Kuo

(10) Patent No.: US 6,576,717 B1
(45) Date of Patent: Jun. 10, 2003

(54) WATER-DISPERSIBLE ACRYLIC-MODIFIED POLYESTER RESINS USED IN COATINGS AND PROCESS FOR THEIR PREPARATION

(75) Inventor: Thauming Kuo, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 08/427,534

(22) Filed: Apr. 24, 1995

Related U.S. Application Data

(62) Division of application No. 08/104,980, filed on Aug. 12, 1993, now abandoned.

(51) Int. Cl.$^7$ .................................................. C08F 20/00
(52) U.S. Cl. ........................ 525/445; 524/514; 524/603; 524/609; 525/291
(58) Field of Search ..................... 525/39, 445, 443, 525/444, 448, 291; 528/275, 290, 294, 295, 302, 306, 307, 308, 381; 524/513, 514, 600, 601, 602, 603, 604, 606, 609

(56) References Cited

U.S. PATENT DOCUMENTS

| | | | | |
|---|---|---|---|---|
| 3,563,942 A | * | 2/1971 | Heiberger | 528/294 |
| 4,119,680 A | * | 10/1978 | Vachon | 528/295 |
| 4,340,519 A | * | 7/1982 | Kotera et al. | 525/444 |
| 4,525,524 A | * | 6/1985 | Tung et al. | 524/601 |
| 4,735,995 A | | 4/1988 | Chettiath | 525/301.5 |
| 4,939,233 A | * | 7/1990 | Jenkins et al. | 525/437 |
| 4,946,932 A | * | 8/1990 | Jenkins | 525/437 |
| 4,973,656 A | * | 11/1990 | Blount | 528/295 |
| 5,156,651 A | | 10/1992 | Girardeau et al. | 525/445 |
| 5,218,042 A | * | 6/1993 | Kuo et al. | 528/295 |
| 5,342,877 A | * | 8/1994 | Clark | 524/513 |
| 5,344,872 A | * | 9/1994 | Debord et al. | 525/437 |

FOREIGN PATENT DOCUMENTS

| | | |
|---|---|---|
| EP | 0499099 A1 | 1/1992 |
| EP | 0558788 A1 | 9/1993 |
| JP | 7543358 | 4/1975 |
| JP | 56139562 | 10/1981 |
| JP | 02310048 | 12/1990 |

OTHER PUBLICATIONS

Billmeyer, Text Book of Polymer Science, Second addition, pp. 355–357, Wiley–Interscience, 1962.*
Zeno W. Wicks, Jr., "Chapter V:Latexes", Organic Coatings: Science and Technology–vol. I:Film Formation, Components, and Appearance, 64 (New York, John Wiley & Sons, Inc.).
Kobayashi (Shikizai Kyokaishi, 58(5), 249–56, 1985).

* cited by examiner

Primary Examiner—Robert Dawson
(74) Attorney, Agent, or Firm—Bernard Graves; Michael Carrier

(57) ABSTRACT

Disclosed is a water-dispersible acrylic-modified polyester resin containing sulfonate groups prepared by addition copolymerization of ethylenically unsaturated vinyl monomers and a polyester. The polyester is prepared from a polycondensation reaction with dicarboxylic acids, glycols, ethylenically unsaturated monomer, and a minor amount of a sulfomonomer. The acrylic-modified polyester is prepared by first producing the polyester under polycondensation conditions followed by the addition polymerization of the ethylenically unsaturated vinyl monomers. The acrylic-modified polyesters can be formed into a coating composition that has zero or very little organic solvent and is very useful to produce crosslinked cured enamels having excellent gloss, hardness, impact resistance, and water resistance such as those used in automotive finishes, appliance, and coil coatings.

6 Claims, No Drawings

WATER-DISPERSIBLE ACRYLIC-MODIFIED POLYESTER RESINS USED IN COATINGS AND PROCESS FOR THEIR PREPARATION

This is a divisional application of application Ser. No. 08/104,980, filed Aug. 12, 1993 and now abandoned.

FIELD OF THE INVENTION

The present invention relates to novel water-dispersible acrylic-modified polyesters, the method of their preparation, and coatings prepared therefrom.

BACKGROUND OF THE INVENTION

Regulations to limit the amount of volatile organic compounds (VOC) of industrial coatings have encouraged research and development projects directed at inventing new waterborne systems such as paints. Polyester and acrylic resins are the two most common polymers used for these types of coating systems. These two polymers are synthesized by different types of polymerization mechanisms, and their chemical structures are basically different. While the ester linkages of polyesters lead to flexible coatings with good impact resistance, they are also prone to hydrolysis which results in poorer enamel stability and coating weatherability. On the other hand, the carbon-carbon bonds formed in acrylic backbones provide coatings with good weatherability, but they also attribute to the coating's brittleness and poor impact resistance.

Which of these two types of resins are used depends upon the desired properties of various coating applications. Nevertheless, it is often desirable to have coatings with good impact resistance as well as weatherability, such as those used for automotive finishes. As a result of this desired mix of properties, the coating industry has attempted to combine and take advantage of these two technologies. One technique to achieve this would be to make resin or solution blends of polyesters and acrylic. This method would generally be good for solvent-based coatings, but would encounter compatibility problems in waterborne coatings since they would phase-separate and form hazy films.

The application of some types of acrylic-modified resins in coatings and related products has been disclosed. JP 51119043 discloses an organic solvent-based high-solids coating composition containing an acrylic resin modified by a polymerizable unsaturated oil-free alkyd resin. Kobayashi (Shikizai Kyokaishi, 58(5), 249–56, 1985) studies the effects of acrylic resins modified with polyesters on the dispersion stability of carbon black in non-aqueous solutions. The resins are prepared by copolymerization of polyesters having maleic anhydride units with vinyl monomers. JP 56139562 discloses thermosetting resin powders containing a polyester-modified vinyl polymer, a phosphoric acid group-containing polymer, and a blocked polyisocyanate which form stable aqueous dispersions when neutralized with triethylamine. U.S. Pat. No. 4,735,995 discloses water-dispersible air-drying acrylic-modified polyesters having acid values greater than about 25.

European Patent Application 499099 discloses receptor sheets for thermal-transfer printing containing graft polymers. JP 02310048 discloses a hydrophilic polyester grafted with vinyl monomers. U.S. Pat. No. 5,156,651 discloses a graft sulfonated polyester for sizing textile threads and fibers.

The above modified resins have not solved the problems and have not produced a resin that provides a flexible coating with good impact resistance, good hardness, and good weatherability.

Water-dispersible polyesters containing sulfomonomers are known. U.S. Pat. No. 4,340,519 discloses the composition of certain crystalline and non-crystalline polyesters copolymerized with a metal sulfonate group-containing aromatic acid and up to 10 mol percent (based on the total polyol content) of a polyvalent polyol selected from trimethylolpropane, trimethylolethane, glycerine, and pentaerythritol. Also, U.S. Pat. No. 4,525,524 discloses liquid systems comprised of polyesters containing certain metal sulfonates and, optionally, up to 3 percent of a branching agent based upon the total diol component. U.S. Pat. No. 3,563,942 discloses linear solvent-soluble copolyester compositions that can be dispersed in water. Water dispersibility is gained by the addition to the copolyester of a small amount (1–2 mol percent) of the metal salt of sulfonated aromatic compounds.

U.S. Pat. Nos. 4,483,963, 4,622,381 and 4,818,569 and JP 62045731, 62021816, and 61289116 disclose high molecular weight, linear polymers end-capped with sulfobenzoyl groups.

Many patents disclose methods to obtain water-dissipatable polyesters by neutralizing residual or unreacted carboxylic acid groups on the polymer with ammonia or various organic amines. U.S. Pat. No. 3,666,698 utilizes this method as well as phenylindandicarboxylic acid to modify coating performance. U.S. Pat. No. 3,699,066 shows the benefits of certain hydroxy-functional amines for neutralization. U.S. Pat. No. 3,549,577 utilizes the amino resin crosslinker as the neutralizing agent then adjusts the pH to prepare an alkaline water-reduced system. In these patents as well as in U.S. Pat. Nos. 3,494,882, 3,434,987, U.K. 1,117, 126, and U.S. Pat. No. 3,345,313 carboxylic acid functionality is completely neutralized with excess base yielding an alkaline paint vehicle.

U.S. Pat. Nos. 4,910,292, 4,973,656 and 4,990,593, the disclosures of which are incorporated herein in their entirety by reference, disclose an improved water-borne polyester resin and coatings specifically containing 5-(sodiosulfo)-isophthalic acid (5-SSIPA or SIP). The clear coating prepared from this resin exhibits good properties of gloss, hardness, flexibility, and solvent resistance. However, as with other polyester resins, coatings prepared from these resins do not have adequate hydrolytic stability and weatherability.

In light of the above, it would be very desirable to produce a resin that forms a flexible coating with good impact resistance, good hardness, good hydrolytic stability, and good weatherability.

SUMMARY OF THE INVENTION

The present invention is directed to a water-dispersible crosslinkable resin composition that comprises the acrylic-modified polyester made of the moieties of bulk or solution addition-copolymerization products:

(I) about 20 to 90 weight percent of a polyester made of the moieties of polycondensation products:
 (a) at least one difunctional dicarboxylic acid which is not a sulfomonomer;
 (b) about 1 to 20 mol percent of at least one sulfomonomer containing at least one metallic sulfonate group or nitrogen-containing non-metallic sulfonate group attached to an aromatic or cycloaliphatic nucleus and at least one functional group selected from the group consisting of hydroxy, carboxyl, and amino;
 (c) at least one difunctional reactant selected from a glycol or a mixture of a glycol and diamine having two —NRH groups, the glycol containing two —C(R$^1$)$_2$—OH groups wherein R in the reactant is hydrogen or an alkyl group of 1 to 6 carbon atoms, and R$^1$ in the reactant is a hydrogen atom, an alkyl of 1 to 5 carbon atoms, or an aryl group of 6 to 10 carbon atoms;

(d) about 1 to 8 mol percent of at least one ethylenically unsaturated monomer which contains at least one carboxyl, hydroxyl, anhydride, or epoxy group;

(e) about 0 to 40 mol percent of a difunctional reactant selected from hydroxycarboxylic acids having one —C(R)$_2$—OH group, aminocarboxylic acids having one —NRH group, amino-alcohols having one —C(R)$_2$—OH group and one —NRH group, or mixtures of said difunctional reactants wherein R in the reactant is hydrogen or an alkyl group of 1 to 6 carbon atoms; and (f) about 0 to 40 mol percent of a multifunctional reactant containing at least three functional groups selected from hydroxyl, carboxyl, and mixtures thereof wherein at least a portion of the multifunctional reactant contains at least three hydroxyl groups, wherein all stated mol percentages are based on the total of all acid, hydroxyl and amino group containing reactants being equal to 200 mol percent, and wherein the polymer contains proportions of acid-group containing reactants (100 mol percent acid) to hydroxy- and amino-group containing reactants (100 mol percent base) such that the value of EQ (base) divided by EQ (acid) is between about 0.5 and 2; and (II) about 10 to 80 weight percent of at least one ethylenically unsaturated vinyl monomer.

The present invention is also directed to a coating composition that comprises:

(A) about 20 to 65 weight percent, based on the weight of the total coating composition, of the acrylic-modified polyester above, (B) about 30 to 70 weight percent, based on the weight of the total coating composition, of water, (C) about 0 to 10 weight percent, based on the total weight of the coating composition, of a suitable organic solvent, and (D) about 0 to 50 weight percent of a crosslinking agent, based on the total weight of the polyester and the crosslinking agent.

The present invention is also directed to a process for the preparation of an acrylic-modified polyester that comprises:

(1) reacting the following reactants under polycondensation conditions to produce a polyester;

(a) at least one difunctional dicarboxylic acid which is not a sulfomonomer;

(b) about 1 to 20 mol percent of at least one sulfomonomer containing at least one metallic sulfonate group or nitrogen-containing non-metallic sulfonate group attached to an aromatic or cycloaliphatic nucleus and at least one functional group selected from the group consisting of hydroxy, carboxyl, and amino;

(c) at least one difunctional reactant selected from a glycol or a mixture of a glycol and diamine having two —NRH groups, the glycol containing two —C(R$^1$)$_2$—OH groups wherein R in the reactant is hydrogen or an alkyl group of 1 to 6 carbon atoms, and R$^1$ in the reactant is a hydrogen atom, an alkyl of 1 to 5 carbon atoms, or an aryl group of 6 to 10 carbon atoms;

(d) about 1 to 8 mol percent of at least one ethylenically unsaturated monomer which contains at least one carboxyl, hydroxyl, anhydride, or epoxy group;

(e) about 0 to 40 mol percent of a difunctional reactant selected from hydroxycarboxylic acids having one —C(R)$_2$—OH group, aminocarboxylic acids having one —NRH group, amino-alcohols having one —C(R)$_2$—OH group and one —NRH group, or mixtures of said difunctional reactants wherein R in the reactant is hydrogen or an alkyl group of 1 to 6 carbon atoms; and (f) about 0 to 40 mol percent of a multifunctional reactant containing at least three functional groups selected from hydroxyl, carboxyl, and mixtures thereof wherein at least a portion of the multifunctional reactant contains at least three hydroxyl groups;

wherein all stated mol percentages are based on the total of all acid, hydroxyl and amino group containing reactants being equal to 200 mol percent, and wherein the polymer contains proportions of acid-group containing reactants (100 mol percent acid) to hydroxy- and amino-group containing reactants (100 mol percent base) such that the value of EQ (base) divided by EQ (acid) is between about 0.5 and 2; and (2) reacting under bulk or solution addition-copolymerization conditions about 20 to 90 weight percent of the polyester made in step (1) with about 10 to 80 weight percent of at least one ethylenically unsaturated vinyl monomer.

DETAILED DESCRIPTION OF THE INVENTION

The water-dispersible acrylic-modified polyester resin of the present invention is very useful in coating applications. The resulting coatings prepared from compositions containing the present acrylic-modified polyester resin exhibit excellent gloss, hardness, impact resistance, and water resistance. As a result the coating compositions are very useful in applications in automotive finishes, appliances, and coil coatings. Additionally, the present invention can be made to form an enamel composition which contains no or very low levels of organic solvents and thus are environmentally friendly, being very useful in applications requiring low volatile organic compounds (VOCs).

The hybrid resins that are the acrylic-modified polyester resins of the present invention are surprisingly water-dispersible, despite the fact that the vinyl monomers employed do not contain hydrophilic ionic groups. Additionally, the applicant has unexpectedly discovered a very narrow range of polymerizable unsaturated moieties, ethylenically unsaturated monomer (d), that can be present in the polyester. Only within this narrow range can a useful polyester be produced without gelation. This range is about 1 to 8 mol percent, preferably 1 to 6 mol percent, based on the total mol percent of the moieties of the polyester component of the resin being 200 percent based on acid and glycol equivalents. This amount is more preferably about 2 to 6 mol percent with a mol percent of about 2.8 to 5.6 mol percent being most preferred. Amounts much below 1 mol percent do not provide sufficient unsaturated moieties to permit the copolymerization of the acrylic onto the polyester resin. However, amounts much above 8 mol percent cause the resulting acrylic-modified polyester to gel, therefore being unusable.

The water-dispersible, crosslinkable resin composition according to the present invention comprises the acrylic-modified polyester made of the moieties of bulk or solution addition copolymerization products:

(I) about 20 to 90 weight percent of a polyester made of the moieties of polycondensation products:

(a) at least one difunctional dicarboxylic acid which is not a sulfomonomer;

(b) about 1 to 20 mol percent of at least one sulfomonomer containing at least one metallic sulfonate group or nitrogen-containing non-metallic sulfonate group attached to an aromatic or cycloaliphatic nucleus and at least one functional group selected from the group consisting of hydroxy, carboxyl, and amino;

(c) at least one difunctional reactant selected from a glycol or a mixture of a glycol and diamine having two —NRH groups, the glycol containing two —C($R^1$)$_2$—OH groups wherein R in the reactant is hydrogen or an alkyl group of 1 to 6 carbon atoms, and $R^1$ in the reactant is a hydrogen atom, an alkyl of 1 to 5 carbon atoms, or an aryl group of 6 to 10 carbon atoms;

(d) about 1 to 8 mol percent of at least one ethylenically unsaturated monomer which contains at least one carboxyl, hydroxyl, anhydride, or epoxy group;

(e) about 0 to 40 mol percent of a difunctional reactant selected from hydroxycarboxylic acids having one —C(R)$_2$—OH group, aminocarboxylic acids having one —NRH group, amino-alcohols having one —C(R)$_2$—OH group and one —NRH group, or mixtures of said difunctional reactants wherein R in the reactant is hydrogen or an alkyl group of 1 to 6 carbon atoms; and (f) about 0 to 40 mol percent of a multifunctional reactant containing at least three functional groups selected from hydroxyl, carboxyl, and mixtures thereof wherein at least a portion of the multifunctional reactant contains at least three hydroxyl groups, wherein all stated mol percentages are based on the total of all acid, hydroxyl and amino group containing reactants being equal to 200 mol percent, and wherein the polymer contains proportions of acid-group containing reactants (100 mol percent acid) to hydroxy- and amino-group containing reactants (100 mol percent base) such that the value of EQ (base) divided by EQ (acid) is between about 0.5 and 2; and (II) about 10 to 80 weight percent of at least one ethylenically unsaturated vinyl monomer.

The amounts of the polyester (I) and the ethylenically unsaturated vinyl monomer (II) are based on the total composition equalling 100 weight percent. The amounts in the composition are about 20 to 90 weight percent polyester and 10 to 80 weight percent of the ethylenically unsaturated vinyl monomer, preferably about 30 to 70 weight percent polyester and about 30 to 70 weight percent ethylenically unsaturated vinyl monomer with an amount of about 50 weight percent of each being most preferred. Amounts much below 20 weight percent of the polyester do not provide enough polyester to have adequate water-dispersibility for the acrylic-modified polyester. However, amounts well below this could be used if the polyester contains sufficient sulfomonomer of (b) to provide adequate water-dispersibility. Additionally, amounts much above 90 weight percent of the polyester would not have a sufficient amount of the ethylenically unsaturated vinyl monomer present in the acrylic-modified polyester to be of significant utility.

The acrylic-modified polyester of the present invention preferably forms a dispersion or predispersion that has a pH between about 4.0 and 7.5, preferably between about 5.0 and 7.0 and essentially has no free carboxyl end groups attached to the sulfomonomer residue of reactant (b). Methods of avoiding this carboxyl end group are disclosed in U.S. Pat. No. 5,218,042 and copending applications Ser. No. 07/970,218 filed Nov. 2, 1992, and Ser. No. 07/954,857 filed Sep. 30, 1992, with the disclosures thereof being incorporated herein by reference in their entirety.

The acrylic-modified polyester of the present invention is hydroxyl-functionalized having a hydroxyl number of about 50 to 200, preferably about 50 to 100 with a hydroxyl number of about 60 to 80 being most preferred. A hydroxyl number much below 50 would have a significant number of acid end groups that would reduce the predispersion stability of a coating composition, whereas hydroxyl numbers much above 200 are not very practical and result in poor coating properties.

The acrylic-modified polyesters of the present invention have an acid number of about 0 to 30, preferably about 0 to 15 with an acid number of about 0 to 10 being most preferred. An acid number much above 30 can have detrimental effects on the water resistance of the coating and is, therefore, not preferred.

The acrylic-modified resin composition of the present invention has a number average molecular weight of about 800 to 10,000 and a weight average molecular weight of about 2,000 to 100,000, more preferably a number average molecular weight of about 1,000 to 5,000 and a weight average molecular weight of about 2,000 to 50,000. Number average molecular weights much below 800 and weight average molecular weights much below 2,000 are not desirable since the coating would not have very good properties. Number average molecular weights above 10,000 and weight average molecular weights above 100,000 would result in decreased water dispersibility.

The difunctional acid or ester reactant of (a) of the acrylic-modified polyester composition of the present invention is preferably an acid selected from the group consisting of oxalic; malonic; dimethylmalonic; succinic; glutaric; adipic; trimethyladipic; pimelic; 2,2-dimethylglutaric; azelaic; sebacic; 1,3-cyclopentane-dicarboxylic; 1,2-cyclohexanedicarboxylic; 1,3-cyclohexane dicarboxylic; 1,4-cyclo-hexanedicarboxylic; phthalic; terephthalic; isophthalic; 2,5-norbornane-dicarboxylic; 1,4-naphthalic; diphenic; 4,4'-oxydibenzoic; diglycolic; thiodipropionic; 4,4'-sulfonyldibenzoic; and 2,5-naphthalenedicarboxylic acids and esters thereof and mixtures thereof. The difunctional dicarboxylic acid or ester reactant of (a) is preferably selected from the group of acids consisting of isophthalic acid, terephthalic acid, phthalic anhydride (acid), adipic acid, tetrachlorophthalic anhydride, pivalic acid, dodecanedioic acid, sebacic acid, azelaic acid, 1,4-cyclohexanedicarboxylic acid, 1,3-cyclohexane-dicarboxylic acid, maleic anhydride, fumaric acid, succinic anhydride (acid), 2,6-naphthalenedicarboxylic acid, and glutaric acid and esters thereof and mixtures thereof. The more preferred difunctional dicarboxylic acid reactants of (a) are selected from the group consisting of isophthalic acid, adipic acid, 1,4-cyclohexanedicarboxylic acid, 1,3-cyclohexanedicarboxylic acid and mixtures thereof with mixtures of adipic acid and other dicarboxylic acids being most preferred.

The sulfomonomer reactant of (b) is preferably selected from the group consisting of difunctional monomers containing a —SO3M group attached to a nucleus selected from the group consisting of benzene, naphthalene, anthracene, diphenyl, oxydiphenyl, sulfonyldiphenyl, and methylenediphenyl, wherein M is Na+, Li+, Mg++, Ca++, Fe++, and Fe+++. The more preferred sulfomonomer reactant of (b) is selected from the group consisting of diols and diol adducts of multifunctional reactant containing at least three hydroxyl groups and a monocarboxylic acid sulfomonomer containing at least one metallic sulfonate group or nitrogen-containing non-metallic sulfonate group attached to an aromatic or cyclo-aliphatic nucleus. Alternatively, a more preferred group of sulfomonomers include 5-sodiosulfoisophthalic acid, dimethyl 5-sodiosulfoisophthalate, 5-lithiosulfoisophthalic acid, and bis(2-hydroxyethyl)-5-sodiosulfoisophthalate.

The difunctional reactant of (c) is preferably a diol selected from the group consisting of ethylene glycol propylene glycol, 1,3-propanediol, 2-methyl-1,3-propanediol, 2,4-dimethyl-2-ethyl-hexane-1,3-diol, 2,2-dimethyl-1,3-propanediol (neopentyl glycol), 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-trimethyl-1,6-hexanediol, thiodiethanol, 1,2-cyclohexanedimethanol, 1,3-cyclohexanedimethanol, 1,4-cyclohexanedimethanol, 2,2,4,4-tetramethyl-1,3-cyclobutanediol, p-xylylene-diol, diethylene glycol, triethylene glycol, tetraethylene glycol, pentaethylene glycol, hexaethylene glycol, heptaethylene glycol, octaethylene glycol, nonaethylene glycol, decaethylene glycols, 2,2,4-trimethyl-1,3-pentanediol, hydroxypivalyl hydroxypivalate, dipropylene glycol, 1,10-decanediol, hydrogenated bisphenol A, and mixtures thereof. The difunctional reactant of (c) is more preferably selected from the group consisting of neopentyl glycol, cyclohexanedimethanol, 2-ethyl-2-butyl-1,3-propanediol, 2,2,4-trimethyl-1,3-pentanediol, hydroxypivalyl hydroxypivalate, and 2-methyl-1,3-propanediol with neopentyl glycol being most preferred.

The ethylenically unsaturated monomer reactant of (d) is preferably a difunctional monomer, more preferably a diacid or anhydride monomer. Suitable examples of this ethylenically unsaturated monomer reactant of (d) include maleic anhydride, maleic acid, fumaric acid, itaconic acid, itaconic anhydride, tetrahydrophthalic anhydride, crotonic acid, crotonic anhydride, acrylic acid, methacrylic acid, 2-hydroxyethyl (meth)acrylate, 2-hydroxypropyl (meth)acrylate, and glycidyl methacrylate, with maleic anhydride being most preferred.

Advantageous difunctional components which are aminoalcohols include aromatic, aliphatic, heterocyclic and other types as in regard to component (e). Specific examples include 5-aminopentanol-1,4-aminomethyl-cyclohexanemethanol, 5-amino-2-ethyl-pentanol-1,2-(4-β-hydroxyethoxyphenyl)-1-aminoethane, 3-amino-2,2-dimethylpropanol, hydroxyethylamine, etc. Generally these aminoalcohols contain from 2 to 20 carbon atoms, one —NRH group and one —C(R)$_2$—OH group.

Advantageous difunctional monomer components which are aminocarboxylic acids include aromatic aliphatic, heterocyclic, and other types as in regard to component (e) and include lactams. Specific examples include 6-aminocaproic acid, its lactam known as caprolactam, omega-aminoundecanoic acid, 3-amino-2-dimethylpropionic acid, 4-(β-aminoethyl)-benzoic acid, 2-(β-amino-propoxy)benzoic acid, 4-aminomethylcyclohexanecarboxylic acid, 2-(β-aminopropoxy)cyclohexanecarboxylic acid, etc. Generally these compounds contain from 2 to 20 carbon atoms.

Advantageous examples of difunctional monomer component (e) which are diamines include ethylene-diamine; hexamethylenediamine; 2,2,4-trimethylhexamethylenediamine; 4-oxaheptane-1,7-diamine; 4,7-dioxadecane-1,10-diamine; 1,4-cyclohexanebismethylamine; 1,3-cycloheptamethylenediamine; dodecamethylenediamine, etc.

Reactant (f), when used, preferably contains 3 to 6 hydroxyl and/or carboxyl groups; more preferred is trimethylolpropane (TMP), trimethylolethane (TME), glycerine, pentaerythritol, erytritol, threitol, dipentaerythritol, sorbitol, trimellitic anhydride, pyromellitic dianhydride, or dimethylolpropionic acid, with TMP being most preferred.

It is preferred that reactant (f) be present in a minor amount up to 40 mol percent, more preferred about 1 to 20 mol percent, with about 10 to 20 mol percent being most preferred.

The polyester portion of the acrylic-modified polyester composition of the present invention preferably comprises about 60 to 100 mol percent of (a), about 4 to 10 mol percent of (b), about 80 to 100 mol percent of (c), about 2 to 6 mol percent of (d), about 0 to 10 mol percent of (e), and about 0 to 20 mol percent of (f).

In other more preferred embodiments of the invention: the water-dissipatable polyester comprises an acid component (moiety) of 20 to about 100 mol percent isophthalic acid, about 10 to about 80 mol percent adipic acid and from about 1 to 20 mol percent 5-sodiosulfoisophthalic acid and a polyol component (moiety) of at least about 60 mol percent neopentyl glycol, 1,4-cyclohexane-dimethanol, 2-ethyl-2-butyl-1,3-propanediol, or a mixture thereof (the term "moiety" as used herein designates the residual portion of the reactant acid or polyol which actually enters into or onto the polymer chain during the condensation or polycondensation reaction).

The preparation of the polyester in step (1) is cited in U.S. Pat. Nos. 4,910,293, 4,973,656, and 4,990,593, the disclosures of which are incorporated herein by reference in their entirety.

The preferred polycondensation reactant conditions for the preparation of the polyester are at a temperature of about 150 to 230° C. in the presence of a catalyst. The catalyst for the polycondensation reaction is preferably an acid catalyst more preferably an organo-metallic compound, such as a tin or titanium containing compound. Suitable examples of the acid catalyst include dibutyltinoxide, stannous oxalate, titaniumtetraisopropoxide, butylstannoic acid, and p-toluenesulfonic acid, with butylstannoic acid being most preferred. A preferred butylstannoic acid catalyst is Fascat 4100 from ATOCHEM USA Inc. The catalytic amount is about 0 to 0.5 weight percent, based on the total weight of reactants, preferably about 0.01 to 0.2 weight percent, with about 0.1 weight percent being most preferred.

The weight average molecule weight of the polyester is preferably 2,000 to 30,000, with 2,000 to 20,000 being most preferred. The number average molecular weight of the polyester is preferably 800 to 5,000, with 800 to 3,500 being more preferred.

It is preferred that the acid number of the polyester be less than 20, with an acid number less than 10 being more preferred.

The ethylenically unsaturated vinyl monomer moiety of (II) is preferably selected from the group consisting of acrylate, methacrylate, styrene, (meth)acrylic acid and vinyl esters. Additionally, the ethylenically unsaturated vinyl monomer moiety of (II) further contains hydroxyl, epoxy, carboxyl, blocked phenol or acetoacetyl functional groups. The ethylenically unsaturated monomer moiety of (II) is more preferably a combination of ethylenically unsaturated vinyl monomers that comprises about 10 to 50 weight percent based on a total weight of (II) of a hydroxy- or epoxy-functionalized vinyl monomer selected from the group consisting of 2-hydroxyethyl (meth)acrylate, 2-hydroxypropyl (meth)acrylate, and glycidyl (meth)

acrylate. The most preferred ethylenically unsaturated vinyl monomer moiety of (II) is selected from the group consisting of methylmethacrylate, n-butyl acrylate, styrene, 2-hydroxyethyl methacrylate, and mixtures thereof.

The process of preparing the acrylic-modified polyester of the present invention comprises (1) reacting the reactants (a), (b), (c), (d), (e), and (f) above under polycondensation conditions to produce a polyester; and, (2) reacting under bulk or solution-addition copolymerization conditions about 20 to 90 weight percent of the polyester made in step (1) with about 10 to 80 weight percent of at least one ethylenically unsaturated vinyl monomer.

The reaction in step (2) is preferably conducted under bulk or solution addition copolymerization conditions at a temperature of about 60 to 150° C. under inert atmosphere in the presence of a free radical initiator. The free-radical initiator is preferably in a suspension, such as initiator in alcohol. The free-radical initiator employed in this second step is selected from organic peroxides or azo compounds, such as benzoyl peroxide, t-butyl hydroperoxide, t-butyl peroxide, t-butyl peroxybenzoate, azobisisobutyronitrile, and 2,2'-azobis(2,4-dimethyl)-valeronitrile. The free radical polymerization reaction is most preferably carried out at the reflux temperature of the solvent used which is generally higher than the thermal decomposition temperature of the initiator employed. The water miscible solvents used in this free-radical polymerization include sec-butanol, isobutanol, isopropanol, n-propanol, ethanol, ethylene glycol monobutyl ether, propylene glycol n-butyl ether, propylene glycol methyl ether, propylene glycol monopropyl ether, dipropylene glycol methyl ether, and diacetone alcohol with isopropanol being most preferred.

An aqueous dispersion of the acrylic-modified polyester is preferably stable. Stability is defined as the absence of polymer coagulation or phase separation of an aqueous polyester dispersion (15 to 80 weight percent polyester solids) after shelf storage for a minimum of three months at 20 to 30° C. Dispersions of the polyesters prepared according to the present invention were generally stable for over three months.

The particular acrylic-modified polyester can be isolated neat; however, it is desirable for typical material handling purposes to prepare a dispersion or solution of the polyester. This dispersion or solution comprises 10 to 50 weight percent of liquid which comprises 0 to 90 weight percent water and 0 to 100 weight percent of a suitable oxygen-containing organic solvent such as alcohols, ketones, esters and ethers;

preferred are low molecular weight alcohols such as $C_{1-C10}$ alcohols, e.g., ethanol, n-propanol, iso-propanol, and iso-butanol. Such a dispersion can be used as a coating composition or can be used as a pre-dispersion to prepare a coating composition. The pH of such a dispersion is preferably about 4 to about 7.5; more preferred is 5 to about 7.

The coating composition of the present invention comprises
(A) about 20 to 65 weight percent, based on the weight of the total coating composition, of the acrylic-modified polyester above,
(B) about 30 to 70 percent, based on the weight of the total coating composition, of water,
(C) about 0 to 10 percent, based on the total weight of the coating composition, of a suitable organic solvent, and
(D) about 0 to 50 weight percent of a crosslinking agent, based on the total weight of the polyester and the crosslinking agent.

The coating composition preferably comprises about 20 to 40 weight percent (A), about 40 to 70 weight percent (B), about 3 to 10 weight percent (C), and the amount of (D) is such that it corresponds to (A) such that the amount of (A) is about 70 to 80 weight percent and the amount of (D) is about 20 to 30 weight percent based on the total of (A) plus (D).

As appreciated in the art, the exact components and properties of components desired for any given coating application can vary, and therefore, routine experimentation may be required to determine the optional components and proportions of components for a given application and desired properties.

The coating composition optionally contains up to 70 weight percent based on the weight of polyester of one or more additional coating additives.

A preferred amount of coating additives is 1 to 30 percent. Examples of such coating additives include flow control additives such as silicones, fluorocarbons, or cellulosics; coalescing solvents such as diethylene glycol monobutyl ether, trimethylpentanediol mono-isobutyrate, or ethylene glycol mono-octyl ether; strong acid crosslinking catalysts such as p-toluenesulfonic acid, trichloroacetic acid, trifluoromethanesulfonic acid, dodecylbenzene sulfonic acid, or dinonylnaphthalene sulfonic acid; pigments such as titanium dioxide, barytes, clay, or calcium carbonate; colorants such as phthalocyanine blue, molybdate orange, or carbon black; biocides such as tin compounds (e.g., tributyltin oxide), quaternary ammonium compounds, or iodine compounds; thickeners such as carboxymethyl cellulose, hydroxypropyl methyl cellulose, ethyl hydroxyethyl cellulose, guar gum; and wetting and dispersing additives that are surfactants such as Disperbyk, Disperbyk-181, Disperbyk-101, BYK-P104S, available from BYK-Chemie USA, and silicones such as the Dow Corning silicones including Dow Corning 14 additive.

It is preferred that the coating composition of the present invention not contain, or be in the substantial absence of basic amine additives. Basic amine additives mean additives that are primary, secondary and tertiary amines such as ammonium hydroxide, N,N'-dimethyl-ethanolamine, and triethylamine. Basic amine additives do not include ammonium salts, such as the ammonium salts of the wetting and dispersing additives.

The coating composition can be prepared by the techniques described herein and/or by techniques known in the art, e.g., as disclosed in U.S. Pat. Nos. 4,698,391, 4,737,551, and 3,345,313; the disclosures of which are incorporated herein by reference in their entirety.

The coating composition can be coated into a substrate and crosslinked using techniques known in the art; e.g., by spray-applying a wet coating and baking in a 150° C. forced air oven for 30 minutes to result in a dry film of about 0.5 to 2 mils (0.0125 to 0.05 mm).

The substrate can be a shaped or formed article or any other common substrate such as paper; films such as polyester, polyethylene or polypropylene; metals such as aluminum or steel; glass; urethane elastomers, primed (painted) substrates; and the like.

The coating composition is preferably a paint such as a clear or pigmented enamel, a lacquer, an ink or a varnish.

After the coating composition is coated onto a substrate and cured (i.e., crosslinked) such cured coating has many desirable properties such as good pencil hardness, good gloss, good flexibility, good stain resistance, good humidity resistance, good impact resistance, and good MEK double rub solvent resistance.

The coating composition preferably contains at least one pigment to be a pigmented enamel. A pigment dispersing additive is preferably used with the pigmented enamel and is selected from Disperbyk-181, Disperbyk, Disperbyk 101, BYK-P104S available from BYK-Chemie USA, and Dow-Corning 14 additive.

Preferred crosslinkers of (D) include substituted melamine and urea resins or residues such as hexamethoxymethylmelamine, hexabutoxymethylmelamine, tetramethoxymethylurea, or tetrapropoxymethylurea, and isocyanate-type crosslinkers such as hexamethylene diisocyanate and isophorone diisocyanate which can also be in the blocked form. Preferred ratios of resin/crosslinker are 70/30 and 80/20.

Suitable water-miscible organic solvents for the enamel composition are the same as those used for the addition polymerization described previously.

In a typical process for the preparation of the enamels, an aqueous dispersion having 50 percent non-volatile is prepared first by dispersing a resin solution (85 percent resin in an organic solvent) with a suitable amount of water after the polymerization; enamels can then be formulated from this aqueous dispersion. The organic co-solvent can be removed by azeotropic distillation of the aqueous dispersion. To ensure the complete removal of the organic solvent, additional water can be added to the dispersion and an excess of the distillate is then collected. Isopropanol forms an azeotrope with water at a lower temperature, therefore, it is preferred as the co-solvent for this purpose.

The enamel can be applied onto a substrate such as metal, wood, plastics, or paper by spray or other suitable techniques. For crosslinking with aminoplast crosslinkers, the coating can be cured by baking at a temperature of 150–170° C. without catalysts. An acid catalyst can be added for curing at 120–150° C. Preferred catalysts are amine-blocked acid catalysts such as Nacure 5225 (King Industries) and BYK-Catalyst (BYK-Chemie USA).

As used herein the term "multifunctional" or "branch-inducing" refers to a compound having three or more reactive hydroxyl and/or carboxyl substituents such as a triol or a tricarboxylic acid; the term "glycol" refers to a compound having two hydroxyl substituents; the term "polyol" refers to a compound having at least two hydroxyl substituents; the term "water-dissipatable polyesters," "water-dissipatable polymer," "polyester material," or "the polyester" refers to the polyester or polyesteramide described above.

Whenever the term "water-dissipatable" or "water-dispersible" is used in this description, it will be understood to refer to the activity of a water or aqueous solution on the polymer. The term is specifically intended to cover those situations wherein the solution dissolves and/or disperses the polyester material therein and/or therethrough.

The term "EQ(base)" means the total number of equivalents of all (100 mol percent base) of the hydroxyl and amino functionality from (b), (c), (d), (e) and (f). This total is obtained by multiplying the number of mols of each reactant in this grouping by its functionality, i.e., the total number of hydroxyl plus amino groups per mol of reactant which are available for condensation polymerization with acid (or ester) groups; and the term "EQ(acid)" means the total number of equivalents of all (100 mol percent acid) of the acid functionality from (a), (b), (d), (e) and (f). This total is obtained by multiplying the number of mols of each reactant in this grouping by its functionality, i.e., the total number of acid groups (or equivalent ester and amide-forming derivatives thereof) which are available for condensation polymerization with hydroxyl and amino groups.

The following examples are to illustrate the present invention but should not be interpreted as a limitation thereof.

EXAMPLES

In the following examples, the completion of the free-radical addition polymerizations was determined by the percent non-volatiles present in the reaction mixture. A sample was removed from the reaction mixture and heated to evaporate the solvent and unreacted monomers to determine the percent non-volatiles.

Example 1

Preparation of Polyester Resin (Resin 1)

This example describes the preparation of a polyester resin using isophthalic acid and adipic acid as the major diacid components.

To a three-neck round bottom flask equipped with a mechanical stirrer, a steam-jacketed partial condenser, a Dean-Stark trap, and a water condenser were charged the following reactants: neopentyl glycol (NPG) 240.0 g (2.31 mole), 5-sodiosulfoisophthalic acid (5-SSIPA) 31.2 g (0.12 mole), and Fascat 4100 catalyst 0.2 g. The mixture was heated to 150° C. and stirred under $N_2$ atmosphere. The temperature was then gradually increased to 200° C., and the distillate (water) was collected in the Dean-Stark trap. After one hour the acid number was determined to be close to zero, and the mixture was cooled to 150° C. The second-stage reactants, isophthalic acid (IPA) 176.8 g (1.07 mole), adipic acid (AD) 106.7 g (0.73 mole), and maleic anhydride (MA) 11.8 g (0.12 mole) were then added. The temperature was gradually raised to 220° C., and the reaction was allowed to continue for eight more hours to yield a resin with an acid number of 8. The properties are illustrated in Table I.

Example 2

Preparation of Acrylic-Modified Polyester Resin (Resin 2)

In a heated 500 ml round-bottom flask equipped with a water condenser were dissolved 50 g of the polyester resin from Example 1 above in 85 g of n-propanol. After cooling, the flask was charged with the following compounds: methyl methacrylate (12.5 g), n-butyl acrylate (12.5 g), styrene (12.5 g), and 2-hydroxyethyl methacrylate (12.5 g). The mixture was then heated to about 90° C. and stirred under nitrogen atmosphere. A suspension of initiator, azobisisobutyronitrile (AIBN) (3.0 g), in n-propanol (15 g) was prepared. This initiator suspension was added sequentially to the reaction mixture every 0.5 hour in three portions. The polymerization was complete after refluxing at 90° C. for 3.5 hours as evidenced through the determination of the percent non-volatiles present in the reaction mixture. About 105 ml of the solvent was then distilled off at 120° C., and water (80 g) was added to give an aqueous dispersion of the resin having 50 percent solids. The properties are illustrated in Table II.

Example 3

Preparation of Polyester Resin (Resin 3)

This example illustrates the preparation of a polyester resin using IPA and 1,4-cyclohexanedicarboxylic acid (1,4-CHDA) as the major diacid components.

To a three-neck round-bottom flask equipped with a mechanical stirrer, a steam-jacketed partial condenser, a Dean-Stark trap, and a water condenser were charged the following reactants: NPG 240.0 g (2.31 mole), 5-SSIPA 31.2 g (0.12 mole), and Fascat 4100 catalyst 0.2 g. The mixture was heated to 150° C. and stirred under $N_2$ atmosphere. The temperature was then gradually increased to 200° C., and the distillate (water) was collected in the Dean-Stark trap. After one hour the acid number was determined to be close to zero, and the mixture was cooled to 150° C. The second-stage reactants, IPA 154.0 g (0.93 mole), 1,4-CHDA 149.2 g (0.87 mole), and MA 11.8 g (0.12 mole) were then added. The temperature was gradually raised to 220° C., and the reaction was allowed to continue for eight more hours to yield a resin with an acid number of 8. The properties are illustrated in Table I.

Example 4

Preparation of Acrylic-Modified Polyester Resin (Resin 4)

In a heated 500 ml round-bottom flask equipped with a water condenser were dissolved 50 g of the polyester resin from Example 3 above in 85 g of n-propanol. After cooling, the flask was charged with the following compounds: methyl methacrylate (12.5 g), n-butyl acrylate (12.5 g), styrene (12.5 g), and 2-hydroxyethyl methacrylate (12.5 g). The mixture was then heated to about 90° C. and stirred under nitrogen atmosphere. A suspension of initiator, AIBN (3.0 g), in n-propanol (15 g) was prepared. This initiator suspension was added sequentially to the reaction mixture every 0.5 hr in three portions. The polymerization was complete after refluxing at 90° C. for 2.5 hours as evidenced through the determination of the percent non-volatiles present in the reaction mixture. About 104 ml of the solvent was then distilled off at 120° C., and water (80 g) was added to give an aqueous dispersion of the resin having 50 percent solids. The properties are illustrated in Table II.

Example 5

Preparation of Polvester Resin (Resin 5)

In this example, 1,4-CHDA was the only major diacid component used in the polyester composition; further, only one half the amount of maleic anhydride was used in comparison with Examples 1 and 3.

To a three-neck round-bottom flask equipped with a mechanical stirrer, a steam-jacketed partial condenser, a Dean-Stark trap, and a water condenser were charged the following reactants: NPG 240.0 g (2.31 mole), 5-SSIPA 31.2 g (0.12 mole), and Fascat 4100 catalyst 0.2 g. The mixture was heated to 150° C. and stirred under $N_2$ atmosphere. The temperature was then gradually increased to 200° C., and the distillate (water) was collected in the Dean-Stark trap. After one hour the acid number was determined to be close to zero, and the mixture was cooled to 150° C. The second-stage reactants, 1,4-CHDA 318.98 g (1.85 mole) and MA 5.9 g (0.06 mole) were then added. The temperature was gradually raised to 220° C., and the reaction was allowed to continue for six more hours to yield a resin with an acid number of 10. The properties are illustrated in Table I.

Example 6

Preparation of Acrylic-Modified Polyester Resin (Resin 6)

In a heated 500 ml round-bottom flask equipped with a water condenser were dissolved 50 g polyester resin from Example 5 above in 85 g of sec-butanol. After cooling, the flask was charged with the following compounds: methyl methacrylate (12.5 g), n-butyl acrylate (12.5 g), styrene (12.5 g), and 2-hydroxyethyl methacrylate (12.5 g). The mixture was then heated to about 90° C. and stirred under nitrogen atmosphere. A suspension of initiator, AIBN (3.0 g), in sec-butanol (15 g) was prepared. This initiator suspension was added sequentially to the reaction mixture every 0.5 hr in three portions. The polymerization was complete after refluxing at 90° C. for 2.5 hours as evidenced through the determination of the percent non-volatiles present in the reaction mixture. About 132 ml of the solvent was then distilled off at 130° C.; then ethylene glycol monobutyl ether (22 g) and water (22 g) were added sequentially to give an aqueous dispersion of the resin having about 70 percent solids. The properties are illustrated in Table II.

Example 7

Preparation of Polyester Resin (Resin 7)

This example illustrates the preparation of a polyester resin using adipic acid (AD) and 1,4-CHDA as the major diacid components. In addition, a branching agent, trimethylolpropane (TMP), was also incorporated into the polyester resin.

To a three-neck round-bottom flask equipped with a mechanical stirrer, a steam-jacketed partial condenser, a Dean-Start trap, and a water condenser were charged the following reactants: NPG 106.0 g (1.02 mole), 5-SSIPA 15.7 g (0.06 mole), and Fascat 4100 catalyst 0.2 g. The mixture was heated to 150° C. and stirred under $N_2$ atmosphere. The temperature was then gradually increased to 200° C., and the distillate (water) was collected in the Dean-Stark trap. After one hour the acid number was determined to be close to zero, the mixture was cooled to 150° C. The second-stage reactants, TMP 13.65 g (0.10 mole), AD 42.81 g (0.29 mole), 1,4-CHDA 100.9 g (0.59 mole), and MA 5.74 g (0.06 mole) were then added. The temperature was gradually raised to 220° C., and the reaction was allowed to continue for seven more hours to yield a resin with an acid number of 6. Isopropanol (105 g) was then added to make a resin solution with 68.6 percent non-volatiles. The properties of the neat resin are illustrated in Table I.

Example 8

Preparation of Acrylic-Modified Polyester (Resin 8)

In a heated 500 ml round-bottom flask equipped with a water condenser were charged with the following compounds: Resin 7 from Example 7 (68.6%, 72.9 g), methyl methacrylate (25 g), styrene (12.5 g), 2-hydroxyethyl methacrylate (12.5 g), and isopropanol (50 g). The mixture was then heated to about 80° C. and stirred under nitrogen atmosphere. A suspension of initiator AIBN (3.0 g), in isopropanol (15 g) was prepared. This initiator suspension was added sequentially to the reaction mixture every 0.5 hr in three portions. The polymerization was complete after refluxing at 80° C. for 4.5 hours as evidenced through the determination of the percent non-volatiles present in the reaction mixture. About 66 g of the solvent was then distilled off at 85° C., and water (102 g) was added to give an aqueous dispersion of the resin having 45 percent solids. The properties are illustrated in Table II.

In the following tables, acid numbers were determined according to ASTM method D1639, molecular weights were estimated by gel permeation chromatography, and glass transition temperatures (Tg) were measured by a differential scanning calorimeter.

TABLE I

Properties of Polyester Resins

| Properties | Resin 1 | Resin 3 | Resin 5 | Resin 7 |
|---|---|---|---|---|
| Acid Number | 8 | 8 | 10 | 6 |
| Calculated OH Number | 68 | 68 | 70 | 85 |
| Mn | 1569 | 1505 | 870 | 1045 |
| Mw | 4276 | 12528 | 2448 | 4317 |
| Tg, °C. | 9 | 40 | 15 | −6 |

Mn: number average molecular weight
Mw: weight average molecular weight

TABLE II

Properties of Acrylic-Modified Polyester Resins

| Property | Resin 2 | Resin 4 | Resin 6 | Resin 8 |
|---|---|---|---|---|
| Calculated OH number | 61 | 61 | 62 | 70 |
| Mn | 2308 | 1867 | 1235 | 1319 |
| Mw | 9015 | 10052 | 9703 | 14481 |
| Tg, °C. | 15 | 32 | 23 | 10 |

Example 9

Removal of Organic Co-Solvent From Aqueous Dispersion

In this experiment, Example 2 was repeated except using 85 g of a different solvent, isopropanol in place of n-propanol as the organic solvent for the polymerization reaction, and an aqueous dispersion was prepared accordingly. In order to remove the organic solvent (isopropanol), a portion of the dispersion (100 g) was transferred into a 500 ml round-bottom flask equipped with an azeotropic-distillation apparatus. To the stirred dispersion was added additional water (80 g) and the mixture was heated. The heating was adjusted in a manner such that the temperature of the solution was kept below 98° C. and the distillation head below 76° C. (vapor temperature). A total of 30 ml of the distillate was collected. No sedimentation formed over time after the removal of the organic co-solvent. The dispersion was free of alcohol or acrylic odor.

Example 10

Preparation of Enamels

Clear enamels were prepared from the resins of Examples 2, 4, 6 and 8 by adding a crosslinker, hexamethoxymethylmelamine (Camel 303 from American Cyanamid Co.), and a flow control additive (20 percent Fluorad FC-430 from 3 M in isopropanol, about 0.5–2 weight percent based on the resin) to the various aqueous dispersions of the resins from the examples. Additional water was added to adjust the enamel viscosity to permit application. A ratio of resin/crosslinker=70/30 was used. These enamels were stable at room temperature for over three months to date.

Example 11

Preparation of Coatings

Coatings were prepared by applying various enamels to cold-rolled steel test panels (ACT 3x9x032 from Advanced Coating Technologies) and baking in an oven at 160° C. for 20 minutes. The thickness of the coating films was about 1.0 to 1.5 mil. The properties of various coatings are listed in Table III. The coating properties were determined according to the following standard methods:

1. Film Thickness (Fisher Deltascope MP 2)
2. Solvent Resistance (MEK Double Rub, ASTM D1308)
3. Gloss (BYK-micro-gloss, ASTM D523)
4. Pencil Hardness (ASTM D3362)
5. Impact Resistance (BYK-Gardner Impact Tester, ASTM D2794)
6. Cleveland Humidity (ASTM D2247)

TABLE III

Coating Properties

| Property | Enamel 2 | Enamel 4 | Enamel 6 | Enamel 8 |
|---|---|---|---|---|
| MEK Double Rub | >200 | >200 | >200 | >200 |
| Gloss, 60°/20° | 101/92 | 101/93 | 99/89 | 100/91 |
| Pencil Hardness | 4 H | 3 H | 4 H | 4 H |
| Impact Resistance (direct/reverse) | 160/140 lb-in | 60/<20 lb-in | 100/20 lb-in | 160/160 lb-in |
| Cleveland Humidity, 500 hours | no effect | blistering | slight effect | no effect |

What is claimed is:
1. A process for the preparation of an acrylic-modified polyester comprising
   (1) reacting the following reactants under polycondensation conditions to produce a polyester:
      (a) at least one difunctional dicarboxylic acid which is not a sulfomonomer;
      (b) about 1 to 20 mol percent of at least one sulfomonomer containing at least one metallic sulfonate group or nitrogen-containing non-metallic sulfonate group attached to an aromatic or cycloaliphatic nucleus and at least one functional group selected from the group consisting of hydroxy, carboxyl, and amino;
      (c) at least one difunctional reactant selected from a glycol or a mixture of a glycol and diamine having two —NRH groups, the glycol containing two —C($R^1$)$_2$—OH groups wherein R in the reactant is hydrogen or an alkyl group of 1 to 6 carbon atoms, and $R^1$ in the reactant is a hydrogen atom, an alkyl of 1 to 5 carbon atoms, or an aryl group of 6 to 10 carbon atoms;
      (d) about 1 to 8 mol percent of at least one ethylenically unsaturated monomer which contains at least one carboxyl, hydroxyl, anhydride, or epoxy group;
      (e) about 0 to 40 mol percent of a difunctional reactant selected from hydroxycarboxylic acids having one —C(R)$_2$—OH group, aminocarboxylic acids having one —NRH group, amino-alcohols having one —C(R)$_2$—OH group and one —NRH group, or mixtures of said difunctional reactants wherein R in the reactant is hydrogen or an alkyl group of 1 to 6 carbon atoms; and
      (f) about 0 to 40 mol percent of a multifunctional reactant containing at least three functional groups selected from hydroxyl, carboxyl, and mixtures thereof wherein at least a portion of the multifunctional reactant contains at least three hydroxyl groups, wherein all stated mol percentages are based on the total of all acid, hydroxyl and amino group containing reactants being equal to 200 mol percent, and wherein the polymer contains proportions of acid-group containing reactants (100 mol percent acid) to hydroxy- and amino-group containing reactants (100 mol percent base) such that the value of EQ (base) divided by EQ (acid) is between about 0.5 and 2;

(2) dissolving the polyester made in step (1) in a water miscible solvent; and (3) reacting under [bulk or] solution addition-copolymerization conditions about 20 to 90 weight percent of the polyester made in step (1) with about 10 tp 80 weight percent of at least one ethylenically unsaturated vinyl monomer.

2. The process according to claim 1 wherein step (1) is conducted under polycondensation conditions at a temperature of about 150 to 230° C. in the presence of about 0 to 0.5 weight percent of an acid catalyst and step (3) is conducted under [bulk or] solution polymerization conditions at a temperature of about 60 to 150° C. under an inert atmosphere in the presence of a free radical initiator.

3. The process according to claim 1 wherein the catalyst used in step (1) is butylstannoic acid in a concentration of about 0.01 to 0.2 weight percent and the initiator of step (3) is a suspension of azobisisobutyronitrile in alcohol sequentially added to the reaction over time in step (3).

4. The process according to claim 1 wherein step (1) is conducted in two stages reacting at least a portion of the sulfomonomer of (a) with a portion of the glycol of (c) followed by reacting the remaining reactants of step (1).

5. The process according to claim 1, wherein the water miscible solvent is selected from sec-butanol, isobutanol, isopropanol, n-propanol, ethanol, ethylene glycol monobutyl ether, propylene glycol n-butyl ether, propylene glycol methyl ether, propylene glycol monopropyl ether, dipropylene glycol methyl ether, and diacetone alcohol.

6. The process according to claim 1, wherein the water miscible solvent is isopropanol.

* * * * *